(12) United States Patent
Maeda

(10) Patent No.: US 6,353,498 B1
(45) Date of Patent: Mar. 5, 2002

(54) ALL OPTICAL INVERTER/AMPLIFIER

(75) Inventor: Yoshinobu Maeda, Mie (JP)

(73) Assignees: National Space Development Agency of Japan; The Japan Space Forum, both of Tokyo; Toyota School Foundation; Toyota Jidosha Kabushiki Kaisha, both of Aichi, all of (JP)

( * ) Notice: Subject to any disclaimer, the term of this patent is extended or adjusted under 35 U.S.C. 154(b) by 0 days.

(21) Appl. No.: 09/531,123

(22) Filed: Mar. 17, 2000

(30) Foreign Application Priority Data

Mar. 20, 1999 (JP) ............................................ 11-116934

(51) Int. Cl.$^7$ .............................. G02F 1/39; H01S 3/00
(52) U.S. Cl. ..................................... 359/341.1; 359/244
(58) Field of Search .............................. 372/6; 359/341, 359/333, 342, 343, 183, 252, 290, 338, 244

(56) References Cited

U.S. PATENT DOCUMENTS

| | | | |
|---|---|---|---|
| 5,434,701 A | * | 7/1995 | Fatehi et al. ................. 359/341 |
| 5,537,243 A | * | 7/1996 | Fatehi et al. ................. 359/341 |
| 5,742,072 A | | 4/1998 | Maeda ......................... 257/17 |

OTHER PUBLICATIONS

Y. Maeda et al., "Negative nonlinear absorption effects in erbium–yttrium aluminum garnets", Journal of Applied Physics, vol. 72, No. 8, Oct. 15, 1992, pp. 3835–3837.

Y. Maeda et al., "Negative light–modulation effect of boron–doped hydrogenated amorphous silicon", Applied Physics Letters, vol. 59, No. 4, Jul. 22, 1991, pp. 390–392.

Y. Maeda et al., "Bistable optical devices with laser diodes coupled to absorbers of narrow spectral bandwidth", Applied Optics, vol. 33, No. 18, Jun. 20, 1994, pp.4077–4081.

Y. Maeda et al., "All–optical inverter operating over a temperature rane of 15–1400 K in erbium–doped lutetium aluminum garnet", Applied Physics Letters, vol. 72, No. 4, Jan. 26, 1998, pp. 395–397.

* cited by examiner

*Primary Examiner*—Thomas H. Tarcza
*Assistant Examiner*—Deandra Hughes
(74) *Attorney, Agent, or Firm*—Wenderoth, Lind & Ponack, L.L.P.

(57) ABSTRACT

The present invention provides an optical function device which is capable of inverting and amplifying an optical signal of the optical communication wavelength band, and executing operation of an image optical signal, and is operable in a wide temperature range, said optical function device composed of a light transmitting medium containing a rare earth element, comprising a portion thereof doped with $1 \times 10^{23}$ per 1 m$^3$ or more of the rare earth element for inverting an optical signal and a portion thereof doped with $1 \times 10^{21}$ per 1 m$^3$ or more of the rare earth element for amplifying the optical signal with an excitation light superposed thereto.

4 Claims, 6 Drawing Sheets

ALL OPTICAL INVERTER/AMPLIFIER

BACKGROUND OF THE INVENTION

1. Field of the Invention

The present invention relates to an optical function device, and more particularly, to a new optical function device which is capable of executing logical operation and optical amplification of optical signal as well as image optical signal and is capable of being operated in a wide temperature range, and thus can be used preferably in optical electronics such as optical communication, optical image processing or optical computer capable of high-level information processing.

2. Description of the Related Art

In an optical communication of recent years, an optical signal is amplified by using an erbium-doped fiber or a crystal, and the optical signal is transferred over a long distance without any electric amplifier, thereby carrying out a high-level information transmission.

On the other hand, there has been developed an optical element for inverting an optical signal by using the negative nonlinear absorption effect of erbium ions (for example, see "All-optical inverter operating over a temperature range of 15–1400K in erbium-doped lutetium aluminum garnet", by Yoshinobu Maeda, Applied Physics Letters, Volume 72, pp395–397).

However, the conventional erbium-doped fiber or crystal has no function of optical operation of an optical signal. The conventional optical element using the negative nonlinear absorption (NNA) has no function or effect of optical amplification of an optical signal. In addition, there has not been developed, for an optical communication wavelength band (1.5 $\mu$m), any optical element capable of controlling an image optical signal directly by another image optical signal and operable in low to high temperatures.

SUMMARY OF THE INVENTION

In view of the foregoing, it is the main object of the present invention to provide a new optical function device which is capable of inverting and amplifying an optical signal of the optical communication wavelength band, and executing operation of an image optical signal, and is operable in a wide temperature range.

The above and other objects, advantages and features of the present invention are accomplished by a optical function device. An optical function device composed of a light transmitting medium containing a rare earth element, comprising a portion thereof doped with $1 \times 10^{23}$ per 1 m$^3$ or more of the rare earth element for executing an inversion of an optical signal, a portion thereof doped with $1 \times 10^{21}$ per 1 m$^3$ or more of the rare earth element for executing an amplification of the optical signal with an excitation light superposed thereto.

In a further aspect of the invention, the rare earth element is Er (erbium), a wavelength of the optical signal falls in a range of 1.5 $\mu$m ~1.6 $\mu$m, and a wavelength of the excitation light is 0.98 $\mu$m band or 1.48 $\mu$m band or 0.8 $\mu$m band.

In another aspect of the present invention, said optical function device is operated in a temperature range of at least −100° C. ~300° C.

BRIEF DESCRIPTION OF THE DRAWINGS

The foregoing objects, features and advantages of the present invention will be better understood from the following detailed description, taken in conjunction with the accompanying drawings, in which.

DETAILED DESCRIPTION OF THE PREFERRED EMBODIMENTS

Figure 1:
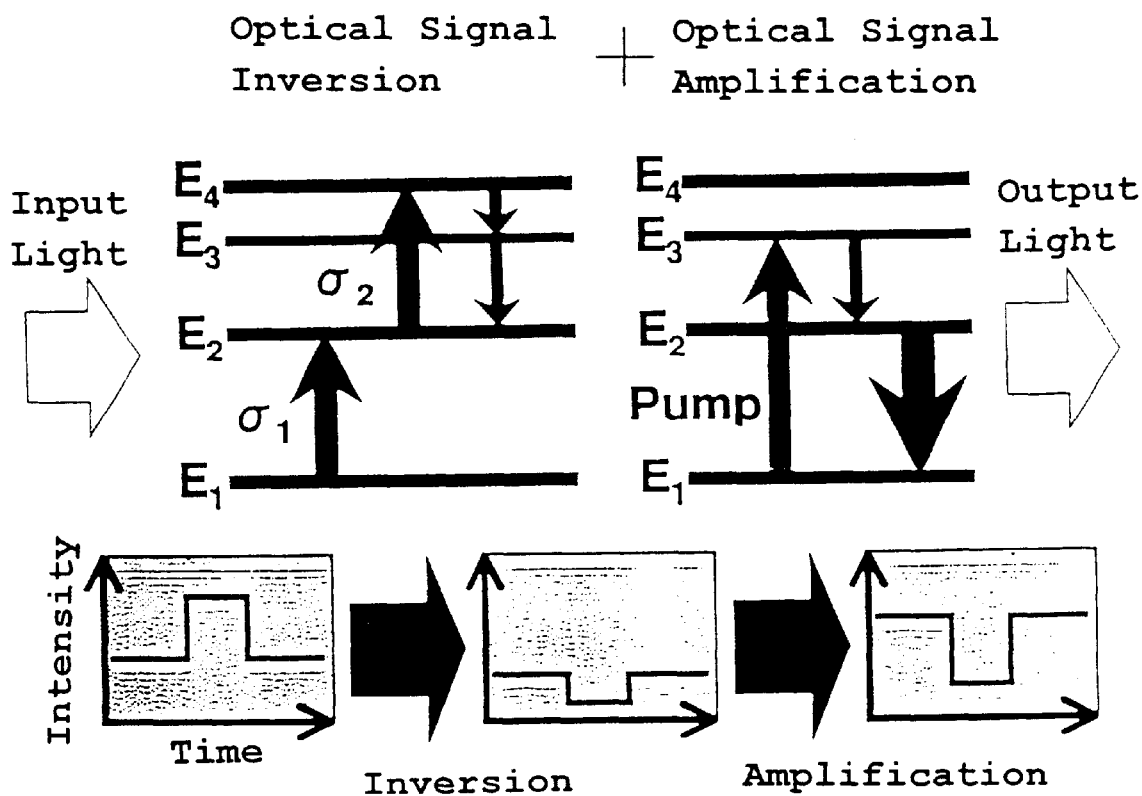
FIG. 1 is a schematic diagram showing optical signal inversion and amplification of an optical function device according to the invention.

According to the optical function device of the invention, firstly, optical signal inversion, that is an inversion of intensity of optical signal, is executed as an important basic principle. FIG. 1 shows an energy level structure in the optical signal inversion. As shown in FIG. 1, when a light having a wavelength of, for example, 1.53 $\mu$m is irradiated on the optical function device, an electron excites to $E_2$ level with an absorption cross-sectional area of $\sigma_1$ and further excites to $E_4$ level with an absorption cross-sectional area of $\sigma_2$. The excited electron is stored in $E_3$ level through relaxation.

The stored electron transits to $E_2$ level mainly by optical emission. When an intensity of the incident light is increased, there occurs an increase of the $\sigma_1$ and $\sigma_2$ and the electron concentration at $E_2$ level in the emission process, thereby increasing absorption of the incident light (so-called "enhanced absorption"). Thus, a light transmitted the optical function device is decreased. Conversely, when the intensity of the incident light is decreased, the enhanced absorption is decreased, thereby increasing the transmitted light. These phenomenon is called "negative nonlinear absorption" (NNA).

Consequently, there is realized an inversion of intensity of optical signal in which when the incident light is increased, the transmitted light is decreased, conversely when the incident light is decreased, the transmitted light is increased.

In addition to the above-described optical signal inversion, according to the invention, optical signal amplification is also carried out as the basic principle. After the optical signal inversion is executed using the negative nonlinear absorption, as shown in FIG. 1, by amplification of the optical signal, that is, optical pumping from $E_1$ to $E_3$, a laser oscillates at transition from $E_2$ to $E_1$.

Therefore, according to the invention, there can be constructed an optical-logic-operation element having the optical signal amplification by combining the negative light input-output characteristic and the optical signal amplifying characteristic as described above. This signifies that an element having a function similar to that of a transistor in electronics can be constructed only by an optical signal.

According to the invention, the rare earth element plays a role of a function element, thus there can be carried out parallel optical operation for operating optical image signals directly by other optical image signals at high density.

According to the invention, a portion of the optical function device for executing the optical signal inversion is doped with $1\times10^{23}$ per 1 m$^3$ or more of a rare earth element, and a portion of the optical function device for executing the optical signal amplification is doped with $1\times10^{21}$ per 1 m$^3$ or more of the rare earth element and also is superposed with a excitation light. Each portion of the optical function device cannot execute as expected if the rare earth element does not satisfy the above-described doping amounts.

Pertinent one of the rare earth element may be Er (erbium) since Er is easy to obtain and handle in doping and slso the inversion and amplificaiton can be executed more effectively. But, of course, there may be used other rare earth element besides Er, or two kinds or more of the rare earth elements such as Er.

A base material containing such a rare earth element may be a crystal such as yttrium aluminum garnet, an amorphous material such as phosphate glass or aluminosilicate glass, or a polymer material.

A further significant feature of the optical function device of the invention is that the element can be operated in a wide temperature range of at least from $-100°$ C. through $300°$ C.

Embodiment 1

Figure 2:
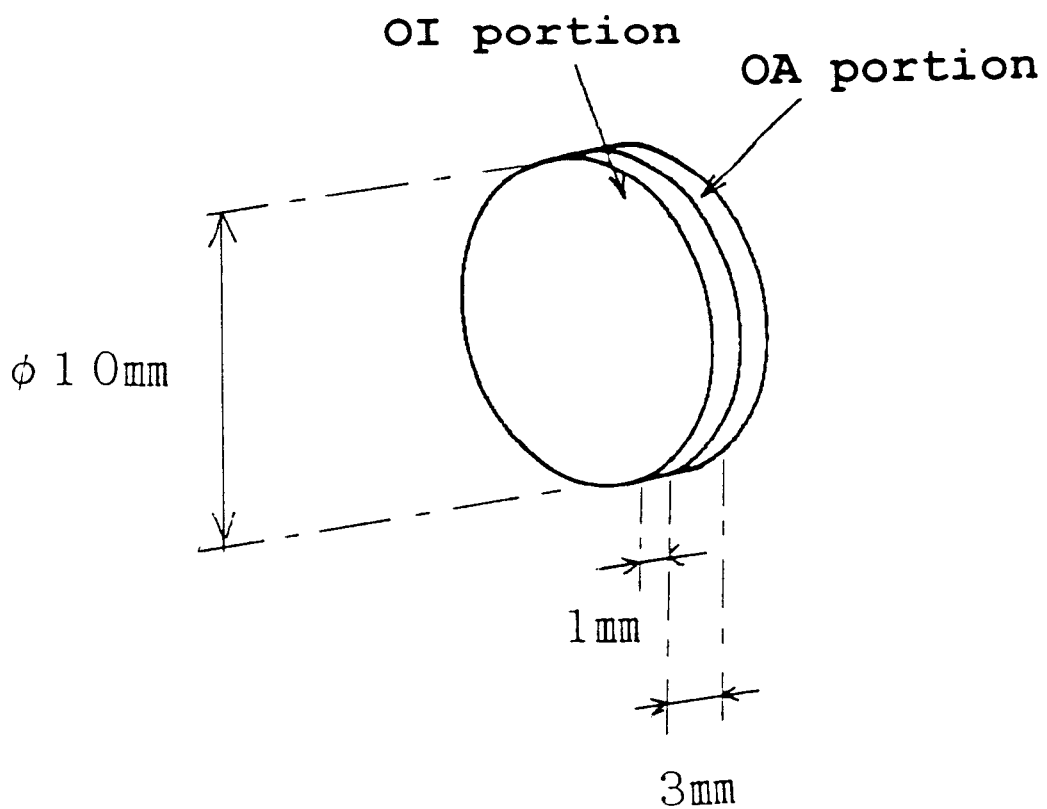
FIG. 2 is a perspective outlook view exemplifying a constitution of an optical function device according to Embodiment 1 of the invention.

FIG. 2 shows an outlook view of an optical function device constituted by a crystal (diameter; 10 mm) of erbium yttrium aluminum garnet (Er:YAG). The composition of Er:YAG of an optical signal inversion portion (OI portion) having a thickness of 1 mm in the drawing is $Er_{1.5}Y_{1.5}Al_5O_{12}$ and the composition of an optical signal amplification portion (OA portion) having a thickness of 3 mm is $Er_{0.5}Y_{2.5}Al_5O_{12}$. An amount of doping Er at the OI portion is about $3\times10^{27}/m_3$ and an amount of doping Er at the OA portion is about $1\times10^{27}/m^3$.

Figure 3:
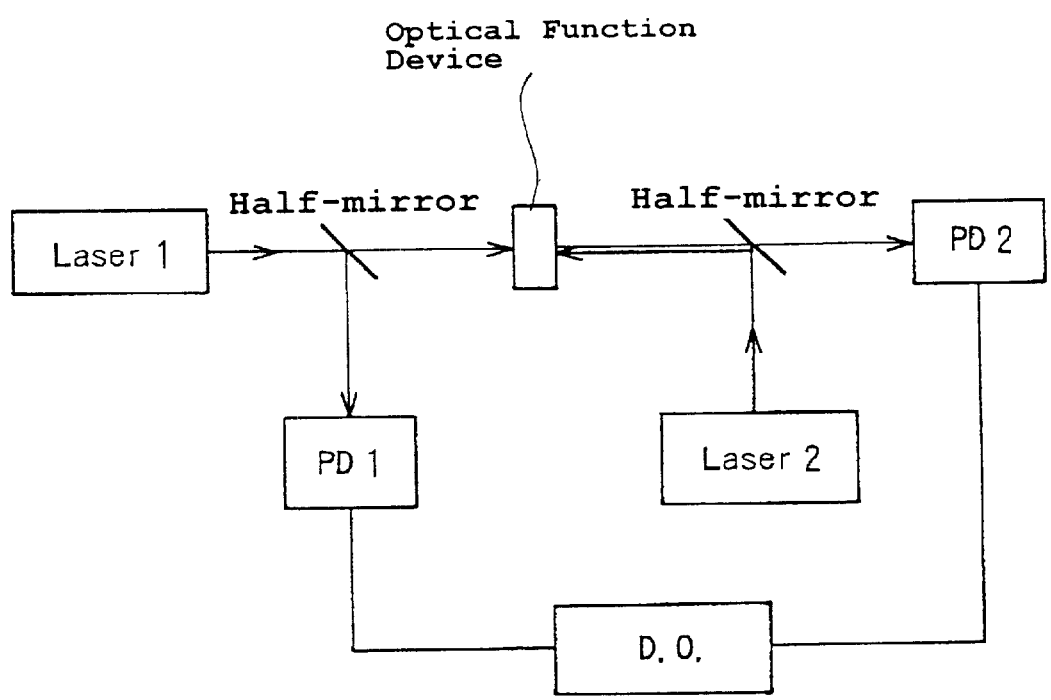
FIG. 3 is a diagram exemplifying a constitution of a measuring system.

FIG. 3 shows a block schematic diagram of a measuring system. As shown in FIG. 3, a semiconductor laser beam having a wavelength of 1532 nm is used as an input signal light (Laser1) and a laser beam having a wavelength of 1480 nm is superposed as an excitation light (Laser2). Other notations in FIG. 3 designate as follows. PD1 and PD2 designate optical detectors for monitoring the input signal light and output signal light, respectively. D.O. designates a digital oscilloscope for observing waveforms of optical signals. Only the optical signal having the wavelength of 1532 nm is detected as the output signal light.

Figure 4:
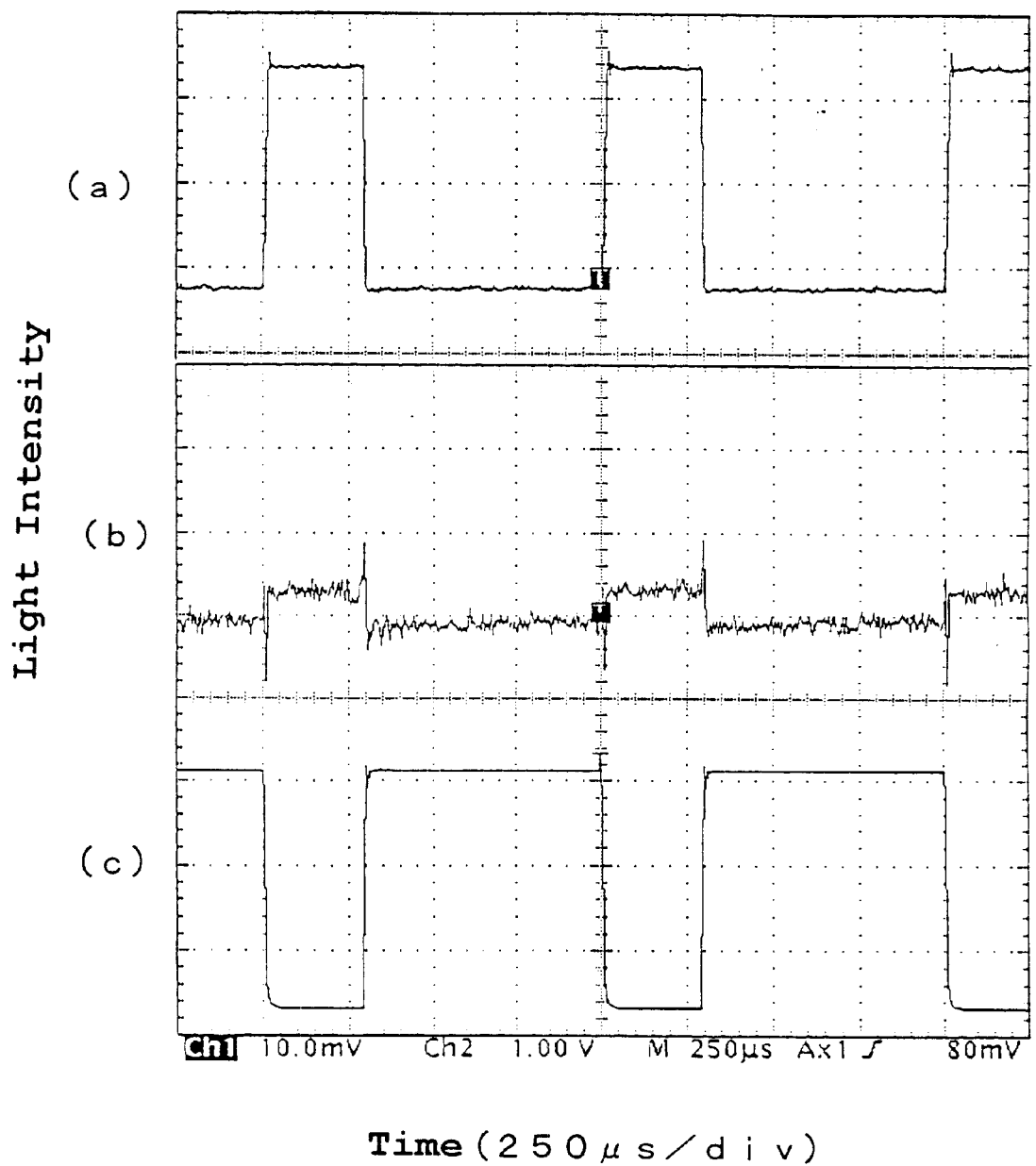
FIGS. 4(a), 4(b) and 4(c) are diagrams exemplifying detected signal waveforms.

FIGS. 4(a), 4(b) and 4(c) show detected signal waveforms. FIG. 4(a) shows the waveform of the output signal light when the excitation light from the Laser 2 is superposed. FIG. 4(b) shows the waveform of the output signal light when the excitation light from the Laser 2 is not superposed. FIG. 4(c) shows the waveform of the input signal light from the Laser 1. As is apparent from the drawings, the input signal light of FIG. 4(c) is outputted having its signal intensity inverted as shown in FIG. 4(b) and amplified about 10 times more than the original input intensity as shown in FIG. 4(a) when the excitation light is superposed.

When the optical function device in FIG. 3 was changed to an element constituted only by the OI portion (no OA portion), the phenomenon of inverting the optical signal was obtained, but the signal could not be amplified even when the excitation light is superposed thereon. On the other hand, when an element constituted only by the OA portion (no OI portion) was used, the optical signal was not inverted.

Figure 5:
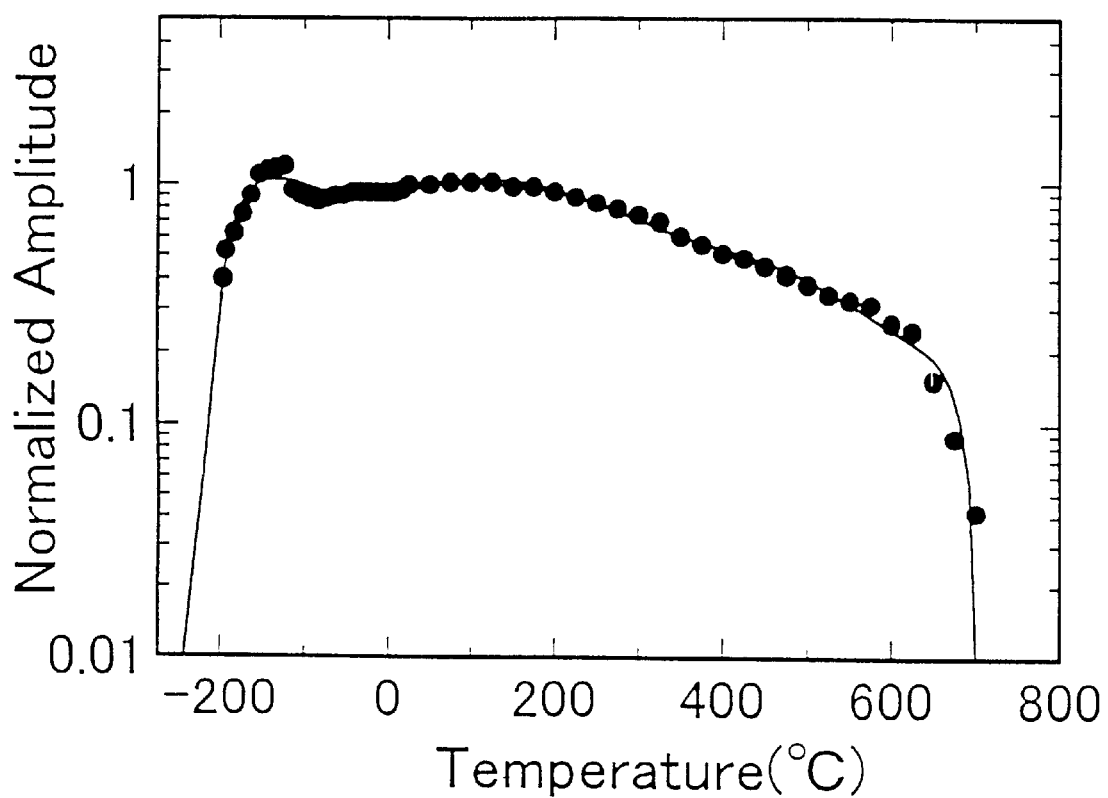
FIG. 5 is a diagram exemplifying temperature dependency of the optical function device of the present invention.

FIG. 5 shows temperature dependency of the optical function device. The ordinate designates an amplitude of a waveform of an inverted output light at respective temperature normalized by dividing it with an amplitude of a waveform of the output light at room temperature. The abscissa designates an element temperature. As apparent from FIG. 5, the element is operated in a wide temperature range of $-200°$ C. through $700°$ C.

Embodiment 2

Figure 6:
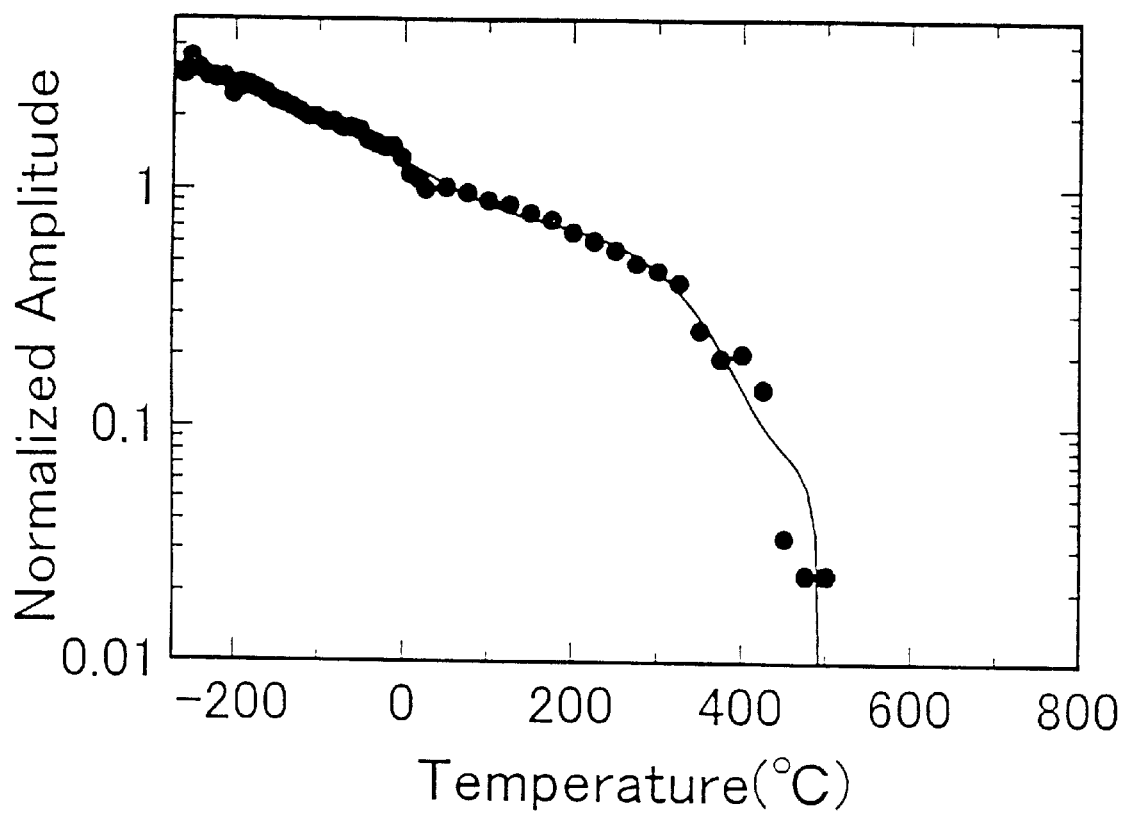
FIG. 6 is a diagram exemplifying temperature dependency of an optical signal inverting by the present invention.

FIG. 6 shows temperature dependency of the inversion of the optical signal having a wavelength of 1530 nm when the optical function device constituted by a erbium-doped phosphate glass is used. A concentration of erbium at the OI portion is about $5\times10^{27}$ m$^{-3}$ and its size is 5×5×5 mm (transmitting length of light is 5 mm). In this example, the OA portion is not provided. The abscissa designates an element temperature and the ordinate designates an amplitude of a waveform of an inverted signal at respective temperature normalized by dividing it with an amplitude of the inverted signal at room temperature. The signal inversion in the range of $-260°$ C. to $500°$ C. is confirmed from the drawing.

As has been explained in details, according to the invention, there is provided the new optical function device capable of executing logical operation for an optical signal of 1.5 μm band used in optical communication and has the signal amplification necessary for being connected in multiple stages. Further, the optical function device uses an optical transition of inner-shell in erbium element, thereby being able to be operated in a wide temperature range. Thus, the element is very effective in a space environment where temperature is violently changed.

While the invention has been described in detail and with reference to specific embodiments thereof, it will be apparent to one skilled in the art that various changes and modifications can be made therein without departing from the spirit and scope thereof.

What is claimed is:

1. An all-optical inverter/amplifier comprised of a light transmitting medium containing at least one rare earth element, said light transmitting medium comprising:

an OI portion doped with $1\times10^{23}$ per 1 m$^3$ or more of said at least one rare earth element for inverting an optical signal; and an OA portion doped with $1\times10^{21}$ per 1 m$^3$ or more of said at least one rare earth element for amplifying said optical signal with an excitation light superposed thereto;

wherein the wavelength of the input optical signal and the wavelength of the output optical signal are the same.

2. The all-optical inverter/amplifier as claimed in claim 1, wherein said rare earth element is Er (erbium), the wavelength of said optical signal falls in a range of 1.5 to 1.6 μm, and the wavelength of said excitation light is selected from the group consisting of 0.8 μm band, 0.98 μm band and 1.48 μm band.

3. The all-optical inverter/amplifier as claimed in claim 1, which operates at a temperature in the range of at least $-100$ to $300°$ C.

4. The all-optical inverter/amplifier as claimed in claim 2, which operates at a temperature in the range of at least $-100$ to $300°$ C.

* * * * *